United States Patent [19]

Nakajima et al.

[11] Patent Number: 5,280,468
[45] Date of Patent: Jan. 18, 1994

[54] OPTICAL RECORDING MEDIUM

[75] Inventors: Yoshio Nakajima, Higashimurayama; Kaori Ichikawa, Koganei, both of Japan

[73] Assignee: Olympus Optical Co., Ltd., Tokyo, Japan

[21] Appl. No.: 921,995

[22] Filed: Aug. 3, 1992

Related U.S. Application Data

[63] Continuation of Ser. No. 679,856, Apr. 3, 1991, abandoned.

[30] Foreign Application Priority Data

Nov. 16, 1989 [JP] Japan .................. 1-296160
Nov. 16, 1990 [JP] Japan .................. 2-311154

[51] Int. Cl.$^5$ ............................... G11B 27/34
[52] U.S. Cl. ........................... 369/275; 369/56; 369/57; 360/2
[58] Field of Search ............ 369/275.1, 32, 57, 59, 369/56; 360/2; 235/454

[56] References Cited

U.S. PATENT DOCUMENTS

| | | | |
|---|---|---|---|
| 4,791,623 | 12/1988 | Deiotte | 369/59 |
| 4,792,936 | 12/1988 | Picard | 369/59 |
| 4,792,937 | 12/1988 | Picard | 369/59 |
| 4,827,462 | 5/1989 | Flannagan | 369/32 |
| 4,910,725 | 3/1990 | Drexler | 369/275.1 |
| 4,945,475 | 7/1990 | Bruffey | 364/200 |
| 4,979,159 | 12/1990 | Tsuruoka | 235/454 |

FOREIGN PATENT DOCUMENTS

63-48659 3/1988 Japan .
63-87680 4/1988 Japan .
63-193394 8/1988 Japan .

*Primary Examiner*—Eugene R. LaRoche
*Assistant Examiner*—Tan Nguyen
*Attorney, Agent, or Firm*—Armstrong, Westerman, Hattori, McLeland & Naughton

[57] ABSTRACT

This optical recording medium includes a data part which is a region for recording data and a directory part which is a region for recording its management or direction information. The directory information relating to the above-mentioned data is recorded in the above-mentioned directory part having a hierarchical tree structure. In the recording and reproducing apparatus by using the above-mentioned recording medium, in retrieving data, by retrieving the directory information in the order of a large classification, medium classification and small classification, the data can be detected. Even a large volume of data can be retrieved at a high speed and the data is efficiently managed. It is effective particularly with recording medium with small numbers of sectors per track such as an optical card.

9 Claims, 7 Drawing Sheets

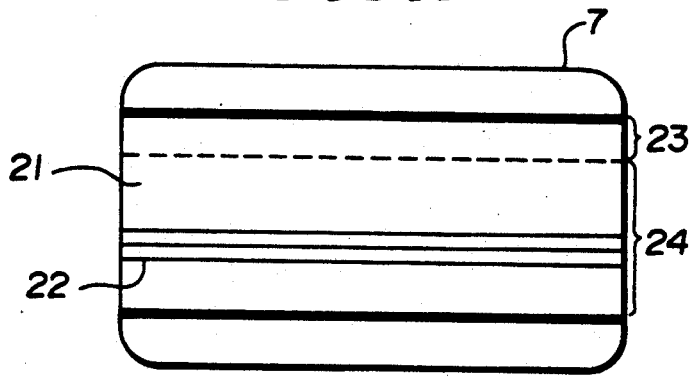
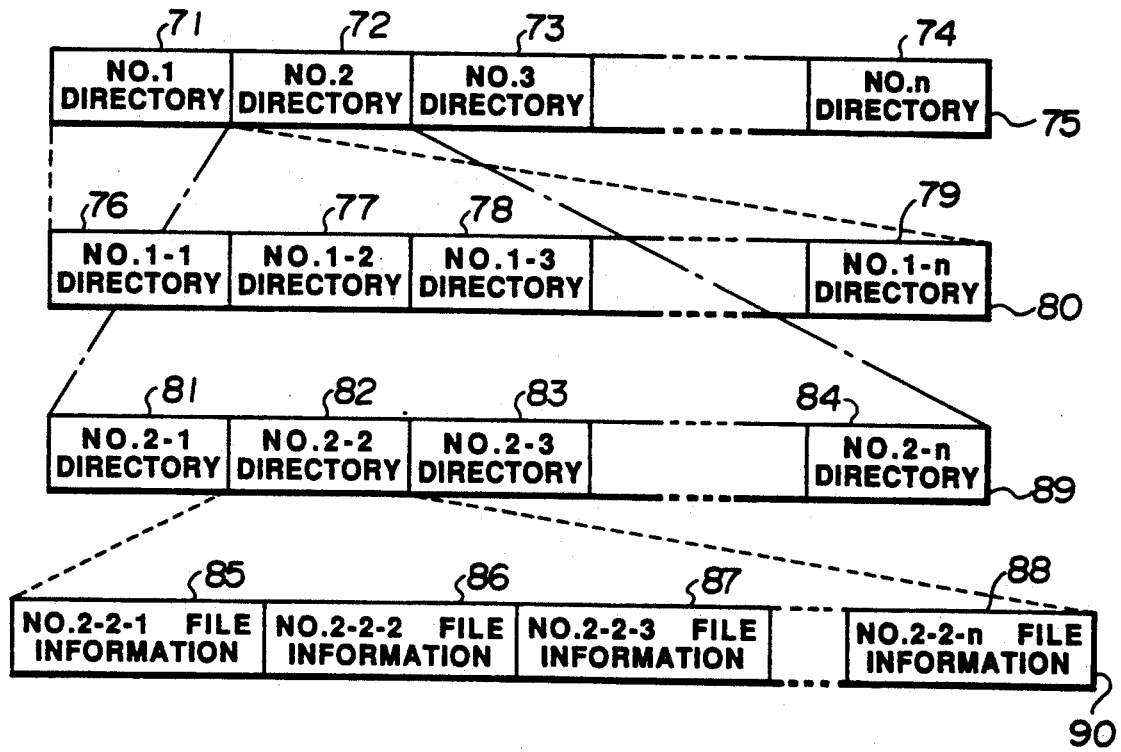
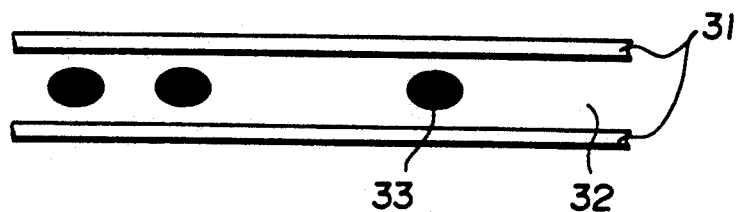

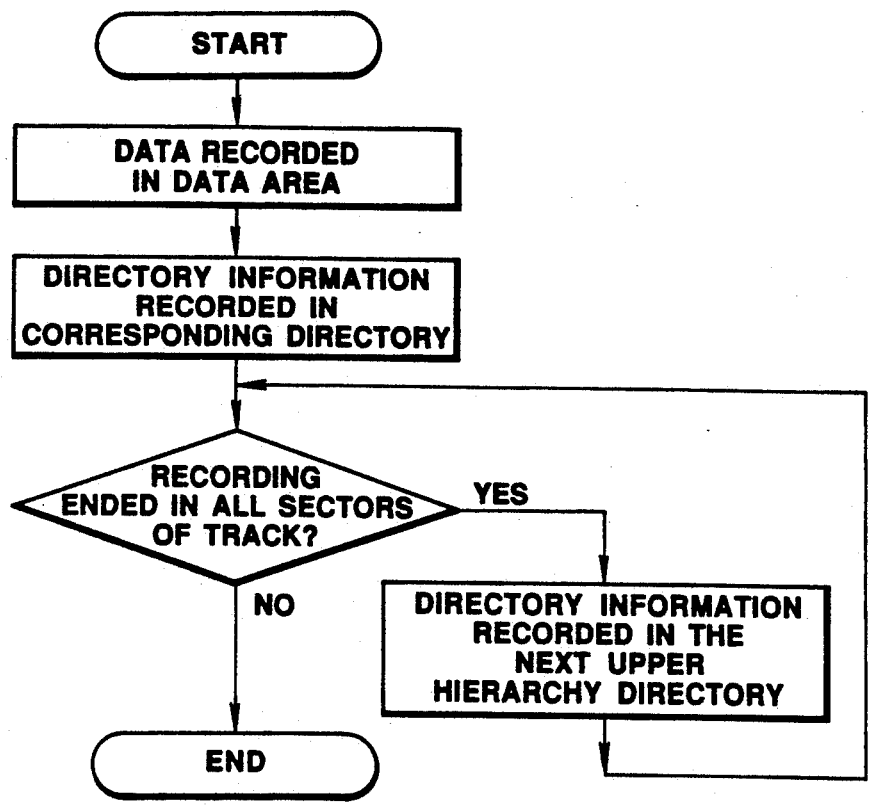
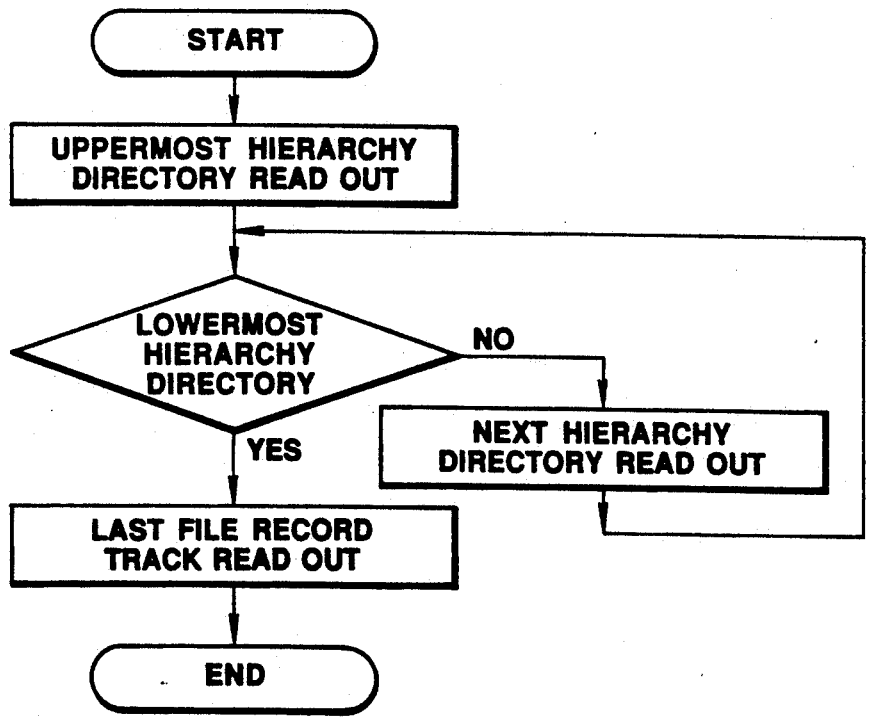

FOR NO.1 HIERARCHY

| | | | | | | | | | | | | | | | | |
|---|---|---|---|---|---|---|---|---|---|---|---|---|---|---|---|---|
| NO.1 TRACK | FOR NO.1 TRANSACTION | FOR NO.2 TRANSACTION | FOR NO.3 TRANSACTION | FOR NO.4 TRANSACTION | FOR NO.5 TRANSACTION | | | | | FOR NO.12 TRANSACTION | FOR NO.13 TRANSACTION | FOR NO.14 TRANSACTION | FOR NO.15 TRANSACTION | FOR NO.16 TRANSACTION | ... |
| NO.2 TRACK | FOR NO.17 TRANSACTION | FOR NO.18 TRANSACTION | FOR NO.19 TRANSACTION | FOR NO.20 TRANSACTION | FOR NO.21 TRANSACTION | | | | | FOR NO.28 TRANSACTION | FOR NO.29 TRANSACTION | FOR NO.30 TRANSACTION | FOR NO.31 TRANSACTION | FOR NO.32 TRANSACTION | ... |
| NO.3 TRACK | FOR NO.33 TRANSACTION | FOR NO.34 TRANSACTION | FOR NO.35 TRANSACTION | FOR NO.36 TRANSACTION | FOR NO.37 TRANSACTION | | | | | FOR NO.44 TRANSACTION | FOR NO.45 TRANSACTION | FOR NO.46 TRANSACTION | FOR NO.47 TRANSACTION | FOR NO.48 TRANSACTION | ... |
| ... | | | | | | | | | | | | | | | |

FIG. 13

| TRACK SECTOR NO. (2BYTES) | DATE YEAR MONTH DAY (3BYTES) | INPUT/ OUTPUT MONEY (1BYTE) | GENERATED SUM (4BYTES) | BALANCE (4BYTES) | ALTERNATIVE TRACK SECTOR NO. (2BYTES) |
|---|---|---|---|---|---|

FOR NO.2 HIERARCHY

| | | | | | | | |
|---|---|---|---|---|---|---|---|
| NO.1 TRACK | FOR NO.1 HIERARCHY NO.1 TRACK | FOR NO.1 HIERARCHY NO.2 TRACK | FOR NO.1 HIERARCHY NO.3 TRACK | ... | FOR NO.1 HIERARCHY NO.6 TRACK | FOR NO.1 HIERARCHY NO.7 TRACK | FOR NO.1 HIERARCHY NO.8 TRACK |
| NO.2 TRACK | FOR NO.1 HIERARCHY NO.9 TRACK | FOR NO.1 HIERARCHY NO.10 TRACK | FOR NO.1 HIERARCHY NO.11 TRACK | ... | FOR NO.1 HIERARCHY NO.14 TRACK | FOR NO.1 HIERARCHY NO.15 TRACK | FOR NO.1 HIERARCHY NO.16 TRACK |
| NO.3 TRACK | FOR NO.1 HIERARCHY NO.17 TRACK | FOR NO.1 HIERARCHY NO.18 TRACK | FOR NO.1 HIERARCHY NO.19 TRACK | ... | FOR NO.1 HIERARCHY NO.22 TRACK | FOR NO.1 HIERARCHY NO.23 TRACK | FOR NO.1 HIERARCHY NO.24 TRACK |
| ... | | | | | | | |

FIG.15

| NO.1 HIERARCHY TRACK NO. (2 BYTES) | DATE OF FIRST TRANSACTION OF MANAGED TRACK (3 BYTES) | DATE OF 2ND TRANSACTION (3 BYTES) | DATE OF 3RD TRANSACTION (3 BYTES) | DATE OF 4TH TRANSACTION (3 BYTES) | DATE OF 5TH TRANSACTION (3 BYTES) |
|---|---|---|---|---|---|
| DATE OF 6TH TRANSACTION (3 BYTES) | DATE OF 7TH TRANSACTION (3 BYTES) | DATE OF 8TH TRANSACTION (3 BYTES) | DATE OF 9TH TRANSACTION (3 BYTES) | DATE OF 10TH TRANSACTION (3 BYTES) | DATE OF 11TH TRANSACTION (3 BYTES) |
| DATE OF 12TH TRANSACTION (3 BYTES) | DATE OF 13TH TRANSACTION (3 BYTES) | DATE OF 14TH TRANSACTION (3 BYTES) | DATE OF 15TH TRANSACTION (3 BYTES) | DATE OF 16TH TRANSACTION (3 BYTES) | |
| BALANCE BEFORE FIRST TRANSACTION (4 BYTES) | BALANCE AFTER LAST TRANSACTION (4 BYTES) | ALTERNATIVE TRACK INFORMATION (6 BYTES) | | | |

FOR NO.3 HIERARCHY

| | | | | | | |
|---|---|---|---|---|---|---|
| NO.1 TRACK | FOR NO.2 HIERARCHY NO.1 TRACK | FOR NO.2 HIERARCHY NO.2 TRACK | FOR NO.2 HIERARCHY NO.3 TRACK | | FOR NO.2 HIERARCHY NO.6 TRACK | FOR NO.2 HIERARCHY NO.7 TRACK | FOR NO.2 HIERARCHY NO.8 TRACK |
| NO.2 TRACK | FOR NO.2 HIERARCHY NO.9 TRACK | FOR NO.2 HIERARCHY NO.10 TRACK | FOR NO.2 HIERARCHY NO.11 TRACK | | FOR NO.2 HIERARCHY NO.14 TRACK | FOR NO.2 HIERARCHY NO.15 TRACK | FOR NO.2 HIERARCHY NO.16 TRACK |
| NO.3 TRACK | FOR NO.2 HIERARCHY NO.17 TRACK | FOR NO.2 HIERARCHY NO.18 TRACK | FOR NO.2 HIERARCHY NO.19 TRACK | | FOR NO.2 HIERARCHY NO.22 TRACK | FOR NO.2 HIERARCHY NO.23 TRACK | FOR NO.2 HIERARCHY NO.24 TRACK |
| --- | | | | | | | |

FIG.17

| NO.2 HIERARCHY TRACK NO. (2 BYTES) | DATE OF MANAGED FIRST TRANSACTION (3 BYTES) | DATE OF NO.1 SECTOR LAST TRANSACTION (3 BYTES) | DATE OF NO.2 SECTOR LAST TRANSACTION (3 BYTES) | DATE OF NO.3 SECTOR LAST TRANSACTION (3 BYTES) |

| DATE OF NO.4 SECTOR LAST TRANSACTION (3 BYTES) | DATE OF NO.5 SECTOR LAST TRANSACTION (3 BYTES) | DATE OF NO.6 SECTOR LAST TRANSACTION (3 BYTES) | DATE OF NO.7 SECTOR LAST TRANSACTION (3 BYTES) |

| DATE OF NO.8 SECTOR LAST TRANSACTION (3 BYTES) | BALANCE BEFORE MANAGED FIRST TRANSACTION (4 BYTES) | BALANCE AFTER NO.8 SECTOR LAST TRANSACTION (4 BYTES) | ALTERNATIVE TRACK INFORMATION, etc. (27 BYTES) |

FIG.18

| FOR NO.4 HIERARCHY TRACK | FOR NO.1 HIERARCHY NO.1 TRACK | FOR NO.1 HIERARCHY NO.2 TRACK | FOR NO.3 HIERARCHY NO.3 TRACK |

FIG.19

| NO.3 HIERARCHY TRACK NO. (2 BYTES) | DATE OF MANAGED FIRST TRANSACTION (3 BYTES) | DATE OF NO.1 SECTOR MANAGED LAST TRANSACTION (3 BYTES) | DATE OF NO.2 SECTOR MANAGED LAST TRANSACTION (3 BYTES) | DATE OF NO.3 SECTOR MANAGED LAST TRANSACTION (3 BYTES) |

| DATE OF NO.4 SECTOR MANAGED LAST TRANSACTION (3 BYTES) | DATE OF NO.5 SECTOR MANAGED LAST TRANSACTION (3 BYTES) | DATE OF NO.6 SECTOR MANAGED LAST TRANSACTION (3 BYTES) | DATE OF NO.7 SECTOR MANAGED LAST TRANSACTION (3 BYTES) |

| DATE OF NO.8 SECTOR MANAGED LAST TRANSACTION (3 BYTES) | BALANCE BEFORE MANAGED FIRST TRANSACTION (4 BYTES) | BALANCE AFTER NO.8 SECTOR MANAGED LAST TRANSACTION (4 BYTES) | ALTERNATIVE TRACK INFORMATION (27 BYTES) |

14-4

OPTICAL RECORDING MEDIUM

This application is a continuation of application Ser. No. 679,856 filed Apr. 3, 1991 abandoned.

BACKGROUND OF THE INVENTION

Field of the Invention

This invention relates to optical recording media and more particularly to an optical recording medium having a data recording part (called a data part hereinafter) which is a region for recording data and a directory information recording part (called a directory part hereinafter) which is a region for recording management information relating to the recorded state of the data.

Related Background Art

Information recording media such as floppy discs and hard discs for recording and reproduction typically use magnetism. Similarly, optical discs and optical cards for recording and reproduction use light. Such recording medium can memorize a large volume of data. In order to efficiently manage such data, they have been managed by providing a directory part which is a management information recording part. This directory part is provided to manage recorded data in a block unit—specifically, in a file or a data block unit. The types of information recorded in the directory part include block names, contents, data block recording positions, data lengths, recorded dates and file categories. In reading out the above-mentioned types of directory data, the directory information of the object data is retrieved from the directory part and the object data is then accessed using the directory information obtained by the earlier retrieval. When handling such large volumes of data on information recording media such as optical discs and optical cards, it has been required that the information be easily retrievable at a high speed based on the recorded date, file category and the like.

In a data recording system disclosed in the publication of Japanese Patent Application Laid Open No. 87680/1988, one prior art example of directory management systems, the memorizing region of the information recording medium is divided into a data part and directory part. In the directory part, as directory information, the information relating to an error correction is recorded in addition to the file name, file length and first track number.

When accessing the data using the directory information in the recording system of this prior art example, it is necessary to sequentially read out the directory information until the file having the object file name is discovered. If the above-mentioned file name is positioned in the first part of the directory part data, the object data can be accessed within a short time. However, in cases where the file name is positioned in the last part of the directory part data, it will be necessary to read in almost all the directory information and the access time will become long. Particularly, in optical recording medium such as optical cards, large volumes of data can be recorded and the number of files will be considerably large. Therefore, in this prior art example, the file in the last part of the directory part and the last track cannot be efficiently retrieved.

The optical recording medium handling apparatus disclosed in the publication of Japanese Patent Application Laid Open No. 48659/1988 can be mentioned as another prior art example. In this apparatus, in the optical memory card of an optical recording medium used to raise the efficiency in recording, no directory part is provided and no directory information is made. In retrieving the last recording track, the data recording region of the entire medium recording surface is binarily searched. Recordings of data are made up to and including the last recording track. The above-mentioned last recording track is retrieved by moving a data reading head over the entire data part much wider than the above-mentioned directory part. Therefore, even if the binary search is used, a considerable access time will be required. For example, in an optical card having 2000 tracks, as 2000 is $2^{11}$, a maximum of 11 track accesses will be required over the entire data region. This can not be said to be an efficient accessing process. Also, in the optical card of such a formation having no directory part, the retrieval of the file name and category is nearly impossible.

A means for retrieving only the directory part by a binary search is considered as a system which combines the above-mentioned two prior art examples. However, in this means, the access region will be narrow, the number of access times will reduce by only several times and there will be no great advantageous effect realized. In this means, the retrieval by the file name and file contents is also nearly impossible.

Further in the data managing system in the optical recording media disclosed in the publication of Japanese Patent Application Laid Open No. 193394/1988, another prior art example, a managing track corresponding to the above-mentioned directory region is provided in an optical card. A predetermined identification mark for each transaction information record is provided in this track and the attribute of the data is recorded in the part of the mark so that where the newest data is recorded may be managed.

However, in this prior art example, there have been found defects. For example, the track in which the transaction information corresponding to a certain time is not known, and thus it takes a long time to retrieve the transaction information directed to data recorded in the past. Further, if the above-mentioned managing track is flawed, it will take time to retrieve the newest transaction information.

A method wherein the management information to which the above-mentioned directory information corresponds is recorded in a floppy disc or hard disc of another medium to manage the information is known as an information managing method for such recording media as optical discs. However, since where in the medium and which apparatus used is not specified in the optical card, such a method is hard to apply. There is also known a method wherein the transaction information which is recorded data on one side of the inner periphery or outer periphery of an optical disc and the directory information is sequentially recorded on the outer or inner periphery of the other side for each record. However, in this optical card, there is a defect in that, since the number of sectors in one track is smaller than in the optical disc and the information is read out by reciprocating the optical card, retrieval takes a considerable amount of time.

SUMMARY OF THE INVENTION

An object of this invention is to provide an optical recording medium wherein a large volume of data is retrievable at a high speed and the data can be managed efficiently. Another object is to provide an optical recording medium wherein, even when the data of the directory information of the management information recording part on the optical recording medium has become unreadable due to a flaw or the like, the desired record information is still retrievable within a short time.

The optical recording medium of the present invention has a data part which is a region for recording data and a directory part which is a region for recording the management information and the rules for recording or retrieving the above-mentioned management information. When directory information is determined, the above-mentioned directory part is formed of a hierarchal tree structure and, on the basis of the above-mentioned rules, the directory information is recorded in the directory part or is retrieved from the above-mentioned directory part. When the directory part is made of a hierarchal structure and the directory information is retrieved, large classifications, medium classifications and small classifications are retrieved in the order mentioned. Thus, a large volume of data can be retrieved at high speed, and the data can be efficiently managed. It is effective particularly in media with a small number of sectors per track such as an optical card.

Also, for example, an optical card for recording the transaction information as data can be suggested as applying the optical recording medium of the present invention. Therein, a plurality of sectors forming the track and having the same sector size for the same track are provided. The tracks of a comparatively small sector size among them are combined to be a directory. The management information having the retrieving information of the transaction information recorded in the transaction recording part and the representative information of the transaction information is recorded in the first hierarchy of this directory part. The management information having the retrieving information of the track of a particular hierarchy so as to manage the track for each predetermined number of tracks and the representative information among the respective management information recorded in the track are recorded in a hierarchy after the second hierarchy so that the directory information may be made hierarchal and the transaction information which is recorded data may be managed. By the way, for the above, there are adopted sector sizes, such as 16 bytes, 32 bytes, 64 bytes, 128 bytes, 256 bytes, 512 bytes or 1024 bytes. As to what track of the hierarchy can be read is known from the directory information read out of the last hierarchy. The target information can be obtained by reading the hierarchies sequentially. That is to say, the objective information can be obtained by reading out only the number of hierarchies. Even in case the directory information of any hierarchy is lost by a flaw or the like, the directory information will be able to be recovered by reading out the predetermined number of tracks of the previous hierarchy managed by that track.

BRIEF DESCRIPTION OF THE DRAWINGS

FIG. 1 is a schematic view showing an information region of an optical card which is an optical recording medium showing the first embodiment of the present invention.

FIG. 3 is a magnified view of an essential part showing recording bits of a recording track of the above-mentioned optical card.

FIG. 4 is a view showing the relations of the directories of the respective hierarchies of the above-mentioned optical card in FIG. 1.

FIG. 8 is a flow chart showing when data are recorded in the optical card of FIG. 1.

FIG. 9 is a flow chart showing when a track in which a file is recorded is retrieved in the optical card of FIG. 1.

FIG. 12 is a view showing the formation of a first hierarchy (lowermost layer) directory part of the above-mentioned optical card of FIG. 10.

FIG. 13 is a view showing an example of a sector format of the above-mentioned first hierarchy directory part of FIG. 12.

FIG. 14 is a view showing the formation of a second hierarchy (lower layer directory part of the above-mentioned optical card of FIG. 10.

FIG. 15 is a view showing an example of a sector format of the above-mentioned second hierarchy directory part in FIG. 14.

FIG. 16 is a view showing the formation of a third hierarchy (upper layer) directory part of the above-mentioned optical card of FIG. 10.

FIG. 17 is a view showing an example of a sector format of the above-mentioned third hierarchy directory of FIG. 16.

FIG. 18 is a view showing the formation of a fourth hierarchy (uppermost layer) directory part of the above-mentioned optical card of FIG. 10.

FIG. 19 is a view showing an example of a sector format of the above-mentioned fourth hierarchy directory of FIG. 18.

DETAILED DESCRIPTION OF PREFERRED EMBODIMENTS

The embodiments of the present invention shall be explained in the following with reference to the drawings.

Figure 2:
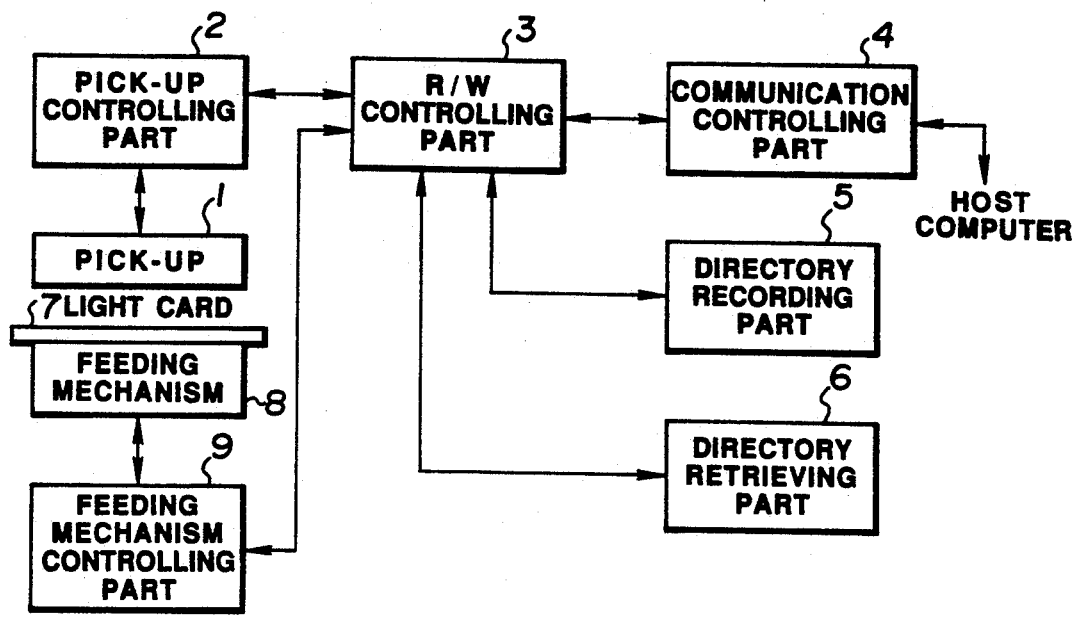
FIG. 2 is a block diagram showing the formation of an information recording and reproducing apparatus of the above-mentioned optical card in FIG. 1.

FIG. 1 is a schematic view showing an information recording region of an optical card which is an optical recording medium showing the first embodiment of the present invention. As shown in FIG. 1, an optical card 7 has a recording medium part 21 which has a plurality of recording regions formed as tracks 22. The tracks 22 are divided between a directory part 23 which is a region for recording the management information relating to the recorded state of data (i.e., the directory information) and a data part 24 which is a data recording region. FIG. 2 is a block diagram showing the formation of a recording and reproducing apparatus for the above-mentioned optical card in FIG. 1. The optical card 7 to be used in this apparatus is a recording medium of a large capacity and is fixed on a feeding mechanism 8 which reciprocates in the track direction of the optical card 7 to read out and write in data on the optical card 7. This reciprocating motion is controlled by a feeding mechanism controlling part 9.

The data of the optical card 7 is read out and written in by using a laser light radiated from a pick-up 1. A pick-up controlling part 2 controls the pick-up 1. When the optical card 7 moves in the track direction, the pick-up controlling part controls the track and focusing of the laser light. It also controls the seeking operation of moving the pick-up 1 in the direction vertical to the track. This seeking operation makes it possible to read out of and write into different tracks.

A communication controlling part 4 is connected to a host computer and the read/write controlling part 3 (mentioned as an R/W controlling part hereinafter). A command transmitted from the host computer is transmitted to the R/W controlling part through the communication controlling part 4.

The R/W controlling part 3 is connected to the pick-up controlling part 2, the feeding mechanism controlling part 9, the directory recording part 5 and the directory retrieving part 6 in addition to the above described communication controlling part 4. The R/W controlling part 3 controls the pick-up controlling part 2 and the feeding mechanism controlling part 9, interchanges data and bivalued signals with each other, corrects errors and adds correcting data. That is to say, the R/W controlling part 3 generally controls reading out or writing in data.

The directory recording part 5 prepares directories. This directory information is written into the directory part 23 in which one track of one hierarchy is divided into a predetermined number n. Here, this predetermined number n is an integral value such as 8 or 16, and is a constant number determined by the track size and directory size. The directory retrieving part 6 retrieves the file and the last recording track from the above-mentioned directory information.

A magnified view of an essential part of the track 22 of the above-mentioned optical card 7 is shown in FIG. 3. A data recording area 32 is formed between two tracking lines 31 and is provided with holes called bits 33 which will be formed by a laser light at the time of recording. At the time of reading out data, the laser light will be passed through the track on the data recording area 32 and its reflected light will be received by a light receiving device. The output signal of this light receiving device is converted to a bivalued signal of 1 and 0 from the difference between the reflected lights of the bit (low reflection factor) and other factors (high reflection factor).

An example of a hierarchy directory is shown in FIG. 4 in which the directory part consists of three hierarchies. Respective directories 71 to 74 form the third hierarchy directory part 75 which is the upper most layer. These directories 71 to 74 store simplified directory information representing the directory information of the second hierarchy directory parts 80, 89, . . . which are a plurality of blocks formed as the next respective layers. Here, the first directory 71 corresponds to the next layer directory 80. The second directory 72 corresponds to the next layer directory 89. Further, No. 2-2 directory 82 which is one sector of the next layer directory 89 stores simplified directory information representing the directory information of the first hierarchy directory part 90, a lower layer. This lower layer directory part 90 contains n file information (85 to 88) by which the data can be accessed.

Figure 5:
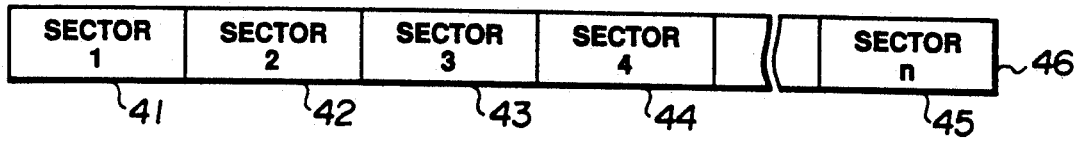
FIG. 5 is a view showing sectors of a track divided in a directory part of the above-mentioned optical card of FIG. 1.

A format of one track in the directory part 23 is shown in FIG. 5 and can record the information for one sector a predetermined number n times in one track, that is, in n sectors. When data is written into the card, the directory information corresponding to the data will be recorded in one sector.

Figure 6:
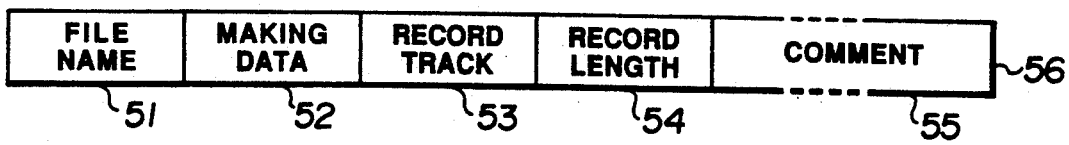
FIG. 6 is a view showing an example of a format of a lower layer directory part of the above-mentioned optical card of FIG. 1.

An example of the directory information in the lower layer, that is, the first hierarchy directory part 90 is shown in FIG. 6. The directory information in the directory part 56 is a combination of the information relating to the file such as a file name (data block name) 51, file making date 52 and comments 55, along with information relating to the recording position such as the track number 53 of the file and the record length 54 of the file. This lower layer directory part is recorded in accordance with a predetermined retrieving file.

The retrieving of file names in alphabetical order shall be described as an example of the retrieving rule. The lower layer directory part having file names beginning with A is positioned below an upper layer directory part. This upper layer directory part has in the lower layer a directory having file names beginning with A or B.

Figure 7:
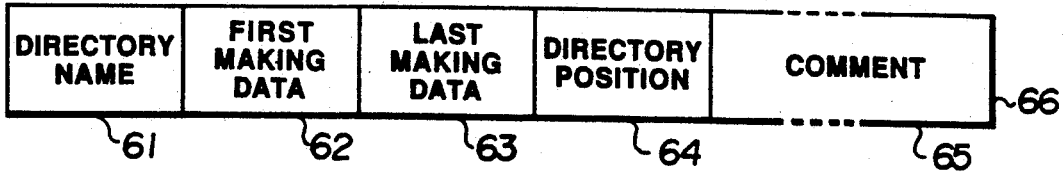
FIG. 7 is a view showing an example of a format of an upper layer directory part of the above-mentioned optical card of FIG. 1.

An example of the above-mentioned upper layer directory is shown in FIG. 7. As the directory information of an upper layer directory part 66, first of all, a name representing the lower directory is given to a directory name 61. A first making data 62 and last making date 63 show the range of dates of when the files were made. A comment 65 is a brief note for supplementing the directory name 61. A directory position 64 shows a track number, etc. of this directory. When the tracks of the upper layer directory part 66 become full, another directory in the next hierarchy which is its upper layer (for example, in the third hierarchy if the directory part 66 is the second hierarchy) will be made. Thus, a directory in several hierarchies will be formed.

The operation at the time of recording and retrieving for the optical card 7 shall be explained in the following on the basis of the flow chart.

FIG. 8 shows a flow chart when data is recorded in the optical card 7. The retrieving rule in this case shall be file names in alphabetical order, as an example, when recording data.

First, data is recorded in a recordable vacant data region. The file name of the data shall be ABC. In this case, the directory information of this file will be recorded in a lower layer directory part which is positioned in a tree structure below the upper directory part show in file names beginning with A. The directory information recorded in this lower directory part is the file name (ABC) of the data and the recorded track number. By the way, an unused sector is used for the lower directory memorizing this information.

When the recorded sector is the last sector of the track, all the directory information of this track will be simplified and recorded in the upper layer directory part positioned above this track. Such directory information includes, for example, the first file making date, last file making date and a representative file name recorded in this track. When all sectors in the track of this upper layer directory part have been recorded, all directory information of this track will be simplified and recorded in the upper layer directory part positioned above this track.

The directory positions of the respective hierarchies within the directory part 23 on the optical card 7 are predetermined by the file numbers which can be recorded. For example, if the tree structure is three hierarchies, the above-mentioned predetermined number n is 16 and the directory part 23 begins with a track number of 1. The uppermost third hierarchy directory part 75 in FIG. 4 will be a track number of 1. Also, the next layer second hierarchy directory part 80 is made with a track number of 2, the next layer second hierarchy directory part 89 is made with a track number of 3. Sequentially, the track numbers up to 17 are formed from the next layer second hierarchy directory part. The track numbers from 17 on are formed of the lower layer first hierarchy directory part. In this case, the track number formed of the lower layer directory $16^2$, that is 256 tracks. The directories of all these hierarchies are allotted in advance so that the retrieval may be easy.

Also, it is necessary to predetermine the retrieval classification in advance. It is predetermined, for example, that the first directory is for those beginning with A and the second directory is for those beginning with B. However, the retrieval classification may be changed in the course of time. When, for example, those files beginning with A are so many as not to be contained only in the first directory, the retrieval classification may be changed so that the first directory may be for those beginning with A and the second directory may be for those beginning with A or B.

On the other hand, the operation of retrieving an objective file is shown in the flow chart in FIG. 9. As shown in this chart, the operation begins with reading out the uppermost layer directory part. For example, a file of DEF is to be retrieved and, in the uppermost layer directory part 75 of FIG. 4, file names beginning with A or B are recorded in the first directory 71 and file names beginning with C or D are recorded in the second directory 72. In this case, the second directory 72 will be the required uppermost layer directory. Then, the next layer directory part 89 is read out. If No. 2-1 directory 81 which is the first sector of the next layer directory part 89 is for file names beginning with C and No. 2-2 directory 82 which is the second sector is for file names beginning with D, No. 2-2 directory 82 of the next layer directory part 89 will be the required directory. Lastly, the lower layer directory part 90 positioned below No. 2-2 directory 82 is read out. The directory of the required file is one of the sectors within this lower layer directory part 90.

As understood from this, the respective hierarchy directories can be divided into a large classification (uppermost layer directories), medium classification (next layer directories) and small classification (lower layer directors) in the retrieving rule.

In such 3-hierarchy directory parts as are described above, when 16 sectors can be recorded in one track, the number of manageable files will be $16^3$, that is, $2^{12}$ files. In an optical card consisting, for example of 2000 tracks, of one file is of a size of one track, movement to a target track will be possible with three accesses (seeking operations). Further, the seeking operation for the retrieval may well be made within the directory part. Therefore, by this method, an objective file can be retrieved within a shorter time than by the system of retrieving all the data part at once.

As described above, in the optical recording medium according to the present invention, the hierarchy directory is of an n-divided tree structure (n sectors in one track) and is one block of one hierarchy. For example, the next layer directory parts 80 and 89 are formed respectively of one track so that the last recorded track and the file can be retrieved more efficiently at a higher speed than by the conventional system of retrieving all the data part at once.

By the way the retrieving classification may use rules other than the alphabetical order including, for example, classifications by the making date, by image data and character data and by identification with particular individuals.

Also, a formation having a combination of two or more retrieving classifications is possible. For example, a first directory is used for the retrieval by alphabetical order and a second directory is used for the retrieval by date. By thus using the directories for respective uses, the data can be managed more efficiently. In this embodiment, an optical card has been explained as an optical card recording medium but an optical disc or other optical magnetic recording medium can be also applied as an optical recording medium.

As explained above, according to the present invention, the directory part is of a hierarchal directory structure. As a result, a large volume of data can be retrieved at a high speed and such data can be managed efficiently.

An information managing system by using an optical recording medium showing the second embodiment of the present invention shall be explained in the following.

Figures 10, 11:
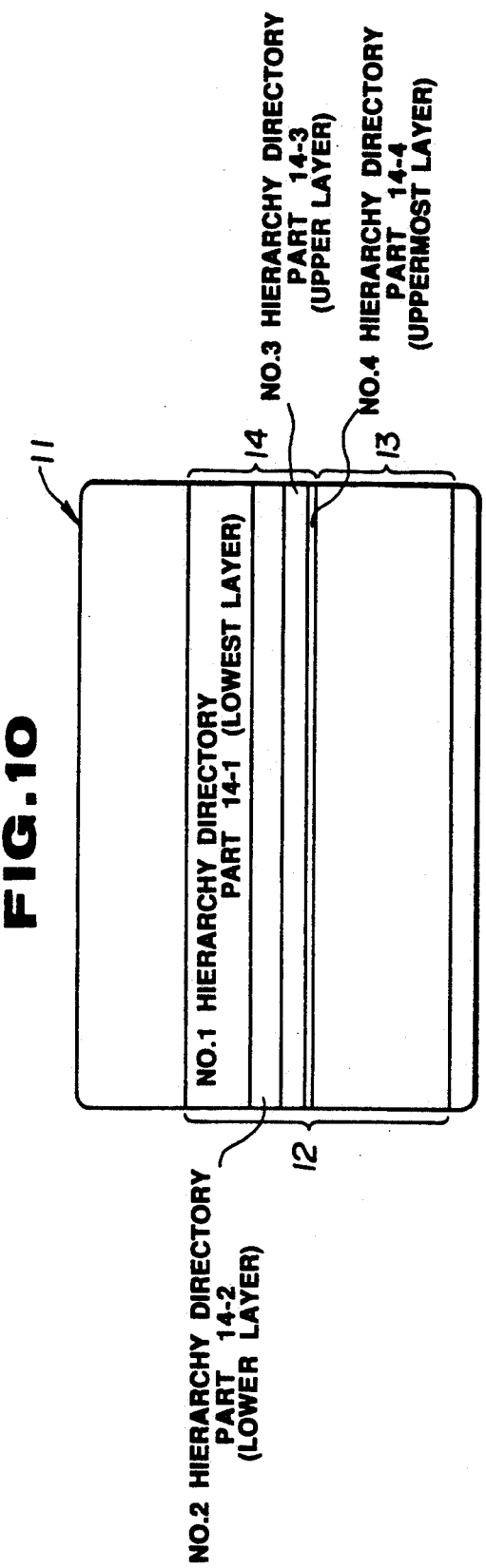
FIG. 10 is a schematic view showing an information region of an optical card of an optical recording medium showing the second embodiment of the present invention.
FIG. 11 is a view showing the formation of a transaction information recording part of the above-mentioned optical card of FIG. 10.

The optical recording medium of this embodiment is an optical card 11 used as a prepaid card and provided, as shown in FIG. 10, in its optical recording part 12 with a transaction information recording part 13 recording transaction information (e.g., the recorded data) and a directory part 14 which is a part recording directory information (e.g., the information managing the recording positions and contents of the above-mentioned data).

The directory part 14 which is the above-mentioned directory information recording part is provided with Nos. 1 to 4 hierarchy (the lowermost layer to uppermost layer) thus forming directory parts 14-1 to 14-4.

The case of recording transaction information with 128 bytes/sector and 5 sectors/track shall be explained in the following.

As shown in FIG. 11, the transaction information recording part 13 is 5 sectors/track and 128 bytes/sector. Nos. 1 to 4 sectors of each track are transaction information recording sectors and the remaining No. 5 sector is an alternative sector in case writing fails. In this transaction information recording part 13, when the total track number of the optical card 1 is, for example, 2500 tracks, 1800 tracks of them will be allotted so that, whenever one transaction is generated, the transaction information sequence from No. 1 will be sequentially written into Nos. 1 to 4 sectors of the sequential track of the transaction information recording part 13, and the directory information will be recorded and registered in the sector of No. 1 hierarchy directory part 14-1 of the directory part 14. By the way, the above-mentioned transaction information consists of data such as buying date, time, article specification, sum specification and shop name.

As shown in FIG. 12, No. 1 hierarchy (the lowermost layer) directory part 14-1 has 16 sectors/track and 16 bytes/sector, and No. 1 hierarchy directory information corresponding to each transaction information is recorded in the sequential sectors of each sequential track. As shown in FIG. 13, as this No. 1 hierarchy directory information is recorded, a track sector number (2 bytes) in which the corresponding transaction information, the date (3 bytes) on which the transaction, receipt or payment judging information (1 byte), total sum (4 bytes) generated by this one transaction, balance (4 bytes) after the transaction and alternating track sector number (2 bytes) when the sector in which the transaction information is written is not good and is alternated to are all generated and written.

This No. 1 hierarchy directory part 14-1 has 16 sectors/track; that is, the No. 1 hierarchy directory part 14-1 manages 16 transactions with one track. Therefore, in order to manage all the transactions (7200 transactions) of the transaction information recording part 13 consisting of 1800 tracks, 450 tracks of 16 sectors/track are prepared as tracks for the No. 1 hierarchy directory information.

When writing for one track of No. 1 hierarchy directory part 14-1 ends, (for example, when the directory information is written in No. 16 sector) the directory information of the corresponding track is then recorded and registered in the sector of No. 2 hierarchy directory part 14-2.

As shown in FIGS. 14 and 15, the above-mentioned No. 2 hierarchy (lower layer) directory part 14-2 has 8 sectors/track and 64 bytes/sector, and records No. 2 hierarchy directory information in the sequential sectors of the sequential track. As shown in FIG. 15, as this No. 2 hierarchy directory information is recorded, a No. 1 hierarchy track number (2 bytes) in which the corresponding directory information, a managed first transaction date (3 bytes), 2nd to 16th transaction dates (3 bytes each), balance (4 bytes) before the managed first transaction, balance (4 bytes) after the managed last transaction and alternative track information (6 bytes) relating to the alternative track ar all generated and written.

This No. 2 hierarchy directory part 14-2 has 8 sectors/tracks; that is, it manages 8 tracks of No. 1 hierarchy with one track. Therefore, in order to manage 450 tracks of No. 1 hierarchy, 57 tracks of 8 sectors/track are prepared as tracks for the No. 2 hierarchy directory information.

When the writing of No. 2 hierarchy directory part 14-2 ends, (for example, when the directory information is written in No. 8 sector) the directory information of the corresponding track is then recorded and registered in the sector of No. 3 hierarch directory part 14-3.

As shown in FIGS. 16 and 17, No. 3 hierarchy (upper layer) directory part 14-3 has 8 sectors/track and 64 bytes/sector and records No. 3 hierarchy directory information in the sequential sectors of the sequential tracks. As shown in FIG. 17, as this No. 3 hierarchy directory information are recorded, a No. 2 hierarchy track number (2 bytes) in which the corresponding directory information is written, first transaction date (3 bytes) of No. 1 sector of the track of the managed No. 2 hierarchy, last transaction date (3 bytes) of No. 1 sector, last transaction date (3 bytes each) of each of Nos. 2 to 8 sectors, balance (4 bytes) before the first transaction of No. 1 sector, balance (4 bytes) after the last transaction of No. 8 sector and information (27 bytes) relating to the alternative track and the like are all generated and written.

This No. 3 hierarchy directory part 14-3 has 8 sectors/track; that is, it manages 8 tracks of No. 2 hierarchy with one track. Therefore, in order to manage 57 tracks of No. 2 hierarchy, 8 tracks of 8 sectors/track are prepared as tracks for No. 3 hierarchy directory information.

When the writing for one track of No. 3 hierarchy directory part 14-3 ends, (for example, when the directory information is written in No. 8 sector) the directory information of the corresponding track is then recorded and registered in the sector of No. 4 hierarchy directory part 14-4.

As shown in FIG. 18, No. 4 hierarchy (the uppermost layer) directory part 14-4 has 8 sectors/track and 64 bytes/sector and records No. 3 hierarchy directory information in the sequential sectors of its tracks. As shown in FIG. 19, as this No. 4 hierarchy directory information is recorded, a No. 3 hierarchy track number (2 bytes) in which the corresponding directory information is written, first transaction date (3 bytes) managed by No. 1 sector of the track of the managed No. 3 hierarchy, last transaction date (3 bytes) managed by No. 1 sector, last transaction date (3 bytes each) managed by each of Nos. 2 to 8 sectors, balance (4 bytes) before the first transaction managed by No. 1 sector, balance (4 bytes) after the last transaction managed by No. 8 sector and information (27 bytes) relating to an alternative track or the like are all generated and written.

This No. 4 hierarchy directory part 14-4 has 8 sectors/track; that is, it manages 8 tracks of No. 3 hierarchy with one track. Therefore, one track is prepared.

As in the above, by the optical card of this embodiment, the transaction information can be managed with a hierarchic directory structure of a tree structure.

A transaction information retrieving method shall be explained in the following.

In retrieving the last transaction information, first, by reading out the tracks of the directory part of the hierarchy corresponding to the first sector not written in in the order from No. 4 hierarchy directory part 14-4 to No. 2 hierarchy directory part 14-4 to No. 2 hierarchy directory part 14-2, the tracks of No. 1 hierarchy directory part 14-1 corresponding to the first sector not written in of No. 2 hierarchy directory part 14-2 are retrieved. Then, by reading out the tracks of this No. 1 hierarchy directory part 14-1, the transaction information corresponding to the last sector written in of this track is retrieved as the last transaction information.

If all the sectors of the tracks of No. 4 hierarchy directory part 14-4 have been written in, the transaction information will have come to the last writing in. Therefore, in this case, the transaction information of the transaction information recording part 13 corresponding to the last sector of the last track of No. 1 hierarchy directory part 14-4 will be retrieved as the last transaction.

In retrieving the past transaction information, first of all, the tracks of No. 4 hierarchy directory part 14-4 are read out. It is checked whether there is one showing the range including the objective date among them or not. If there is none, the tracks of No. 3 hierarchy directory part 14-3 corresponding to the first sector not written in are read out, and it is checked in the same manner whether there is one showing the range including the objective date among them or not. When there are none showing the range including the objective date among the tracks of No. 3 hierarchy directory part 14-3, then the tracks of No. 2 hierarchy directory part 14-2 corresponding to the first sector not written in of this track are read out, and it is checked in the same manner whether there is one showing the range including the objective date among them or not. If there are none, the tracks of No. 1 hierarchy directory part 14-1 corresponding to the first sector not written in are read out. In case there is no objective date in the track of No. 1 hierarchy directory part 14-1, the objective transaction information will not have been written into the corresponding optical card 1.

In reading out the above respective hierarchies, when one showing the range of the object date comes out, the tracks of each hierarchy of a number smaller by 1 corresponding to that sector are pursued and the corresponding tracks of No. 1 hierarchy directory part 14-1 are read out to retrieve the objective transaction information.

As in the above, in the information managing system on the optical card in this embodiment, the directory information of the transaction information is hierarchized. The management information having the retrieving information of the transaction recorded in the transaction information recording part and the representative information of the transaction information are recorded in No. 1 hierarchy. The directory information having the retrieving information of the tracks of the hierarchy so as to manage the tracks of the hierarchy for each predetermined track number and the representative information of the directory information recorded in the tracks are all recorded in the No. 2 and beyond hierarchies. This is done so that, even if one directory information among them (for example, one track of No. 3 hierarch becomes illegible) the track of No. 2 hierarchy corresponding to that track may be read out to compensate it. Thus, as the directory information of the transaction information is hierarchized and recorded in the directory part 14, the danger can be effectively dispersed. Even if a flaw or the like is produced in the directory part 14, the desired transaction information will be able to be retrieved within a short time.

What is claimed is:

1. An optical card having a data part consisting of a first plurality of parallel tracks for recording data and a directory part consisting of a second plurality of parallel tracks for recording directory information to manage the data, wherein the directory information being recorded in said directory part is formed in a hierarchical tree structure, and wherein said directory part of said optical card includes at least a first hierarchy, the directory information of said directory part in said first hierarchy of said tree structure is recorded in one of said second plurality of parallel tracks the track being divided into n sectors where n is the maximum possible number of the directory information contained in said first hierarchy, wherein said optical card includes a number of hierarchies of said directory part that are predetermined and tracks of directory regions in said number of hierarchies are allotted in advance to directory regions of all hierarchies in said directory part.

2. An optical card having a data part consisting of a first plurality of parallel tracks for recording data and a directory part consisting of a second plurality of parallel tracks for recording directory information to manage the data, wherein the directory information being recorded in said directory part is formed in a hierarchical tree structure, and wherein said directory part of said optical card includes at least a first hierarchy, the directory information of said directory part in said first hierarchy of said tree structure is recorded in one of said second plurality of parallel tracks the track being divided into n sectors where n is the maximum possible number of the directory information contained in said first hierarchy, wherein for the directory information to be written into sectors of at least one track of the first hierarchy in said directory part, there exists a region for recording the directory information regarding said second plurality of tracks into directory regions of a corresponding lower second hierarchy.

3. An optical card having a data part consisting of a first plurality of parallel tracks for recording data and a directory part consisting of a second plurality of parallel tracks for recording directory information to manage the data, wherein the directory information being recorded in said directory part is formed in a hierarchical tree structure, and wherein said directory part of said optical card includes at least a first hierarchy, the directory information of said directory part in said first hierarchy of said tree structure is recorded in one of said second plurality of parallel tracks the track being divided into n sectors where n is the maximum possible number of the directory information contained in said first hierarchy, wherein a number of sectors of a track in a hierarchy of a directory part varies in response to an amount of information being handled.

4. An optical card according to claim 3 wherein a number of hierarchies of said directory part is predetermined.

5. An optical card having a data part consisting of a first plurality of parallel tracks for recording data and a directory part consisting of a second plurality of parallel tracks for recording directory information to manage the data, wherein the directory information being recorded in said directory part is formed in a hierarchical tree structure, and wherein said directory part of said optical card includes at least a first hierarchy, the directory information of said directory part in said first hierarchy of said tree structure is recorded in one of said second plurality of parallel tracks the track being divided into n sectors where n is the maximum possible number of the directory information contained in said first hierarchy, wherein an alternative sector relating to a track of said data part is arranged on the track of said data part.

6. An optical card having a data part consisting of a first plurality of parallel tracks for recording data and a directory part consisting of a second plurality of parallel tracks for recording directory information to manage the data, wherein the directory information being recorded in said directory part is formed in a hierarchical tree structure, and wherein said directory part of said optical card includes at least a first hierarchy, the directory information of said directory part in said first hierarchy of said tree structure is recorded in one of said second plurality of parallel tracks the track being divided into n sectors where n is the maximum possible number of the directory information contained in said first hierarchy, wherein transaction information is recorded in said data part.

7. An optical card according to claim 5, wherein said first hierarchy of said directory part has recorded therein management information with retrieving information of transaction information recorded in a transaction information recording part of said first hierarchy and representative information of the transaction information, and a second hierarchy along with additional following hierarchies have recorded therein management information with retrieving information for said second plurality of tracks of said first hierarchy and tracks of other lower hierarchies, respectively, so as to manage the tracks of said first and other lower hierarchies, and the representative information in said tracks.

8. An optical card having a data part consisting of a first plurality of parallel tracks for recording data and a directory part consisting of a second plurality of parallel tracks for recording directory information to manage the data, wherein the directory information being recorded in said directory part is formed in a hierarchical tree structure, and wherein said directory part of said optical card includes at least a first hierarchy, the directory information of said directory part in said first hierarchy of said tree structure is recorded in one of said second plurality of parallel tracks the track being divided into n sectors where n is the maximum possible number of the directory information contained in said first hierarchy, wherein a number of hierarchies of said directory part is automatically determined by a quantity of data recorded in said data part.

9. An optical card having a data part consisting of a first plurality of parallel tracks for recording data and a directory part consisting of a second plurality of parallel tracks for recording directory information to manage the data, wherein the directory information being recorded in said directory part is formed in a hierarchical tree structure, and wherein said directory part of said optical card includes at least a first hierarchy, the directory information of said directory part in said first hierarchy of said tree structure is recorded in one of said second plurality of parallel tracks the track being divided into n sectors where n is the maximum possible number of the directory information contained in said first hierarchy, wherein said data part is recorded and retrieved on the basis of the directory information of said hierarchial structure.

* * * * *